US008206481B2

(12) United States Patent
Smithies et al.

(10) Patent No.: US 8,206,481 B2
(45) Date of Patent: Jun. 26, 2012

(54) HEPA (H-10) PERFORMANCE SYNTHETIC NONWOVEN AND NANOFIBER COMPOSITE FILTER MEDIA

(75) Inventors: Alan Smithies, Overland Park, KS (US); Robert Henry Devine, II, Lee's Summit, MO (US); Jack T. Clements, Lee's Summit, MO (US)

(73) Assignee: BHA Group, Inc., Kansas City, MO (US)

( * ) Notice: Subject to any disclaimer, the term of this patent is extended or adjusted under 35 U.S.C. 154(b) by 578 days.

(21) Appl. No.: 12/394,320

(22) Filed: Feb. 27, 2009

(65) Prior Publication Data

US 2010/0218471 A1  Sep. 2, 2010

(51) Int. Cl.
*B01D 50/00* (2006.01)

(52) U.S. Cl. ........ 55/486; 55/498; 55/527; 55/528; 55/510; 55/524; 55/487; 55/521

(58) Field of Classification Search ............ 55/486, 55/498, 527, 528, 510, 524, 487, 521
See application file for complete search history.

(56) References Cited

U.S. PATENT DOCUMENTS

| 7,309,372 B2 | 12/2007 | Kahlbaugh et al. |
| 7,316,723 B2 | 1/2008 | Chung et al. |
| 2006/0096260 A1 | 5/2006 | Bryner et al. |
| 2008/0217241 A1 | 9/2008 | Smithies et al. |
| 2008/0302072 A1 | 12/2008 | Hassmann et al. |
| 2008/0314010 A1 | 12/2008 | Smithies et al. |
| 2008/0314011 A1 | 12/2008 | Smithies et al. |
| 2008/0315464 A1 | 12/2008 | Smithies et al. |
| 2008/0315465 A1 | 12/2008 | Smithies et al. |

FOREIGN PATENT DOCUMENTS

| EP | 1674144 A1 | 6/2006 |
| WO | 2006071979 A1 | 7/2006 |

OTHER PUBLICATIONS

EP 10153019.4, Search Report and Written Opinion, Jul. 30, 2010.

*Primary Examiner* — Jason M Greene
*Assistant Examiner* — Dung H Bui
(74) *Attorney, Agent, or Firm* — Pearne & Gordon LLP (57) ABSTRACT

A composite filter media structure and an associated method of making are provided. The structure includes a base substrate that includes a nonwoven fabric substrate formed from a plurality of bicomponent synthetic fibers using a spunbond process. The composite filter media structure includes a nanofiber layer deposited on one side of the base substrate by an electro-blown spinning process. In one aspect, the base substrate and the nanofiber layer are configured to provide at least an 85% filtration efficiency measured in accordance with an ASHRAE 52.2-1999 test method. In another aspect, the nanofiber layer has a basis weight of about 2.0 g/m$^2$ to about 3.0 g/m$^2$.

10 Claims, 9 Drawing Sheets

HEPA (H-10) PERFORMANCE SYNTHETIC NONWOVEN AND NANOFIBER COMPOSITE FILTER MEDIA

BACKGROUND OF THE INVENTION

1. Field of the Invention

The invention relates generally to a filter element, and more particularly, to a filter element having a corrugated or embossed composite nonwoven filter media.

2. Discussion of the Prior Art

Some known filter media composite constructs incorporate a wet-laid paper making process to produce the substrate, and an electro-spun technology to deposit a lightweight nanofiber coating on one or both sides of the filter media substrate. Typically the media substrate has a basis weight of 100-120 grams per square meter ($g/m^2$), and the nanofiber layer has a basis weight of 0.5 $g/m^2$ or less.

Figure 1:
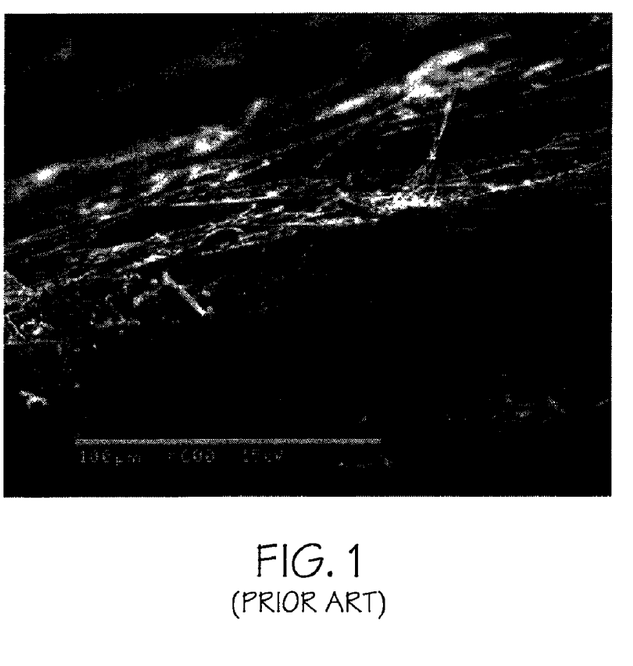
FIG. 1 is a photomicrograph of a prior art example of an electrospun nanofiber layer on wet laid substrate.

It is known that some lightweight nanofiber layers may be subject to high mechanical stress applications. Such applications may be of interest for nanofiber layers formed from fibers with diameters less than 500 nanometer (nm), and more typically, 100 nm. Also, known electro-spun nanofiber layers are two dimensional in structure when attached to a substrate, as shown in FIG. 1, with a single fiber layer in thickness. It is known that there may be fiber shedding where the nanofibers are shed from the filter media because of relatively weak attraction bonds between the nanofibers and the base media for conventional electro-spun fibers that rely on polarity attraction forces. Such may have some reduced filtration performance aspects.

Filter media composite constructs may be used to provide for clean air provision to various devices. Such devices may include turbine blades. Typical, known filter media may have a new or clean operating efficiency providing for around 55% of capture of 0.3-0.4 μm particles, at a pressure drop typically greater than 7.0 mm H2O, when tested in accordance with the ASHRAE 52.2-1999 test procedure at the known operating flow rate.

Turning to example device that contain turbine blades, it is logical to try to maintain the turbine blades clean. One current procedure for cleaning turbine blades requires taking the turbine off-line at periodic intervals to water wash the blades clean. Turbine down time may be expensive because the turbine is not operating and therefore, power generation is curtailed. It would be desirable to provide a higher efficiency filter media than the known filter media to reduce or eliminate turbine down time to clean the turbine blades.

The best in performance of current technology is rated at F-9, using standard wet laid base media coated with an electrospun fiber surface layer. Too date the maximum efficiencies have been limited by the electrospinning process to around a maximum of 75% efficiency when challenged with 100% 0.30 micron DOP particles. This has been achieved with either heavy layers of elecrospun fibers on one surface of a wet laid base media or the use of a nanofiber layer on both surfaces of the base media.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a composite filter media structure that includes a base substrate. The base substrate includes a nonwoven fabric substrate formed from a plurality of bicomponent synthetic fibers using a spunbond process. The composite filter media structure includes a nanofiber layer deposited on one side of the base substrate by an electro-blown spinning process. The base substrate and the nanofiber layer are configured to provide at least an 85% filtration efficiency measured in accordance with an ASHRAE 52.2-1999 test method.

In accordance with another aspect, the present invention provides a composite filter media structure that includes a base substrate. The base substrate includes a nonwoven fabric substrate formed from a plurality of bicomponent synthetic fibers using a spunbond process. The composite filter media structure includes a nanofiber layer deposited on one side of the base substrate by an electro-blown spinning process. The nanofiber layer has a basis weight of about 2.0 $g/m^2$ to about 3.0 $g/m^2$.

In accordance with yet another aspect, the present invention provides a method of making a composite filter media. The method includes forming a nonwoven fabric substrate formed from a plurality of bicomponent synthetic fibers using a spunbond process. The method including applying a nanofiber layer by electro-blown spinning a polymer solution to form a plurality of nanofibers on at least one side of the nonwoven fabric to form the composite filter media such that the composite filter media has a filtration efficiency of at least about 85%.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Examples of a high performance composite filter media and a method of making the composite filter media in accordance with one or more aspects of the present invention are described in detail below. In general, the composite filter media includes a bicomponent synthetic nonwoven base substrate and at least one surface layer of a nanofiber. In one specific example, such composite filter media provides enhanced filtration performance when configured into a filter element or cartridge and used in a pulsed, gas turbine inlet filter housing or similar industrial filtration system. Also, in one example the new composite filter media may be configured into a filter cartridge or filter element with subsequent processes such as corrugating and pleating and general assembly. Corrugating the filter media provides a large volume of passageways for low restriction air flow on both the "clean" and "dirty" sides of the composite filter media. In one example, the composite filter media may provide an initial filtration efficiency of about 85% retained capture of 0.3-0.4 μm particles, when tested in accordance with the American Society of Heating, Refrigerating and Air-Conditioning Engineers (ASHRAE) 52.1 test procedure, which is about a 10% increase in performance compared to known filter media. In addition, the composite media may provide the 85% efficiency at a lower pressure drop than known filter media. In one example, the composite filter media has a resistance (or pressure drop) of less than 6.0 mm water.

Also, the composite filter media may have a beneficial durability when exposed to extensive and intensive dust loading and cleaning challenges and achieves a higher efficiency. Such beneficial durability may be an improvement over existing technology. One reason for the improved performance (e.g., at least 85% efficiency) may be that a basis weight of the nanofiber of approximately 2.0-3.0 g/m². Such a basis weight may be greater than known filter media. The example range between approximately 2.0-3.0 g/m² has been found to be a useful weight for the nanofiber layer. The higher basis weight may permit the filter media to clean down more effectively under reverse pulse cleaning than known filter media.

Figure 2:
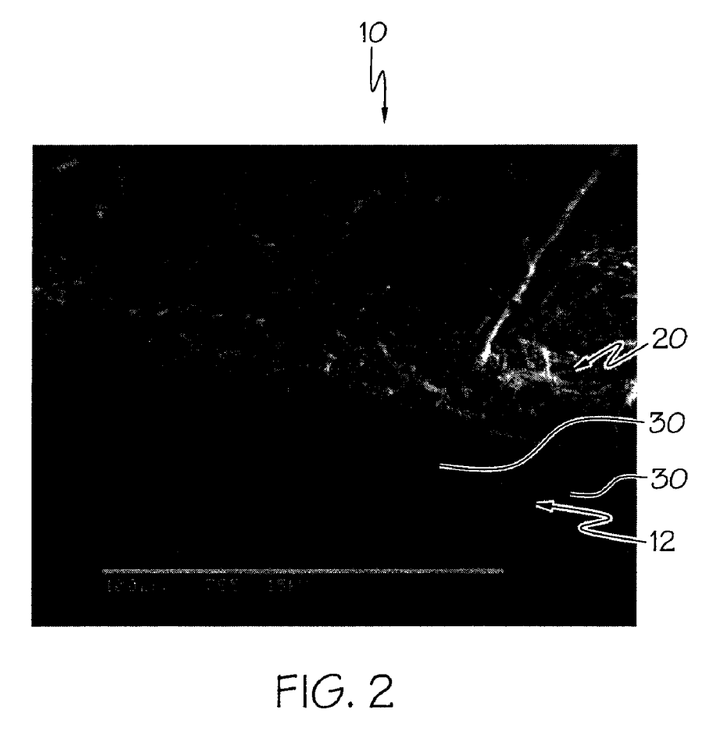
FIG. 2 is a photomicrograph of a first example of an electro-blown nanofiber membrane layer on a spunbond bicomponent substrate in accordance with one aspect of the present invention.

FIG. 2 shows one example of a composite filter media 10 in accordance with at least one aspect of the present invention in the form of a spunbond substrate 12 in combination with a nanofiber layer 20. The combination of the nanofiber layer 20 and the spunbond substrate 12 provides for a durable three dimensional surface filtration layer, which has an extensive multi-layer tortuous path that permits high efficiency and fine particle capture without substantially restricting air flow or increasing pressure drop. The multi-layer tortuous path may include small pores. Such structure has been found to be extremely durable against the mechanical forces in a pulsed filtration system, especially in comparison to the two dimensional nanofiber layer with minimal thickness. For this shown example, the basis weight of the nanofiber layer 20 is in the range of approximately 2.0-3.0 g/m². The thickness of an example nanofiber layer 20 on the spunbond substrate 12 or a plurality of bicomponent fibers 30 can be approximately 10 microns, as opposed to a typical maximum thickness of 3 microns for a single-layer prior art example, such as that shown in FIG. 1.

The media may also provide for lower pressure drop build-up because of less deflection of the filter media from the forces exerted on the filter media during the filtering and reverse cleaning operations. Also, the spunbond corrugated media substrate 12 may be more efficient than known filter media substrates at an equivalent or lower pressure drop. The spunbond media provides bonding to consolidate fibers 30 into a fabric or fabric substrate. In one aspect, the bicomponent fibers 30 used to form the media substrate 12 are finer than fibers used to form known filter media. In addition, the adherence bond between the base media substrate 12 and the nanofiber layer 20 may be enhanced due to additional thermal processing during a corrugating or embossing operation.

Figure 3:
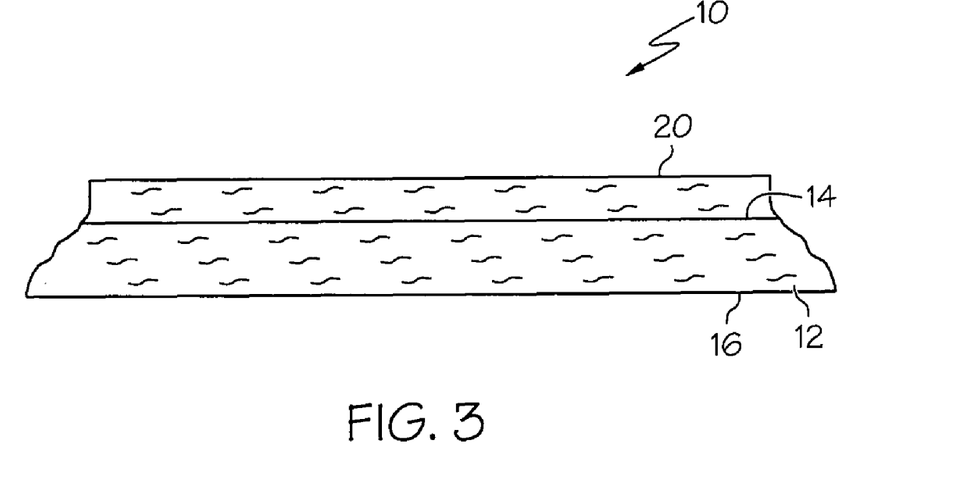
FIG. 3 is a schematic cross-sectional illustration of an example composite filter media using the nanofiber membrane layer and spunbond bicomponent substrate of FIG. 2.

FIG. 3 is a schematic, sectional illustration of the composite filter media 10 to show the sheet-like construction of a specific example. As can be appreciated, the filter media 10 includes the base media substrate 12 and the nanofiber layer 20. The base media substrate 12 has a first side 14 and a second side 16. In one aspect, the nanofiber layer 20 is deposited onto the first side 14 of the media substrate 12. Although not explicitly shown in an example illustration, it is to be appreciated that the nanofiber layer 20 could be deposited onto the second side 16 or nanofiber layers 20 could be deposited on each of first and second sides 14 and 16.

Figure 4:
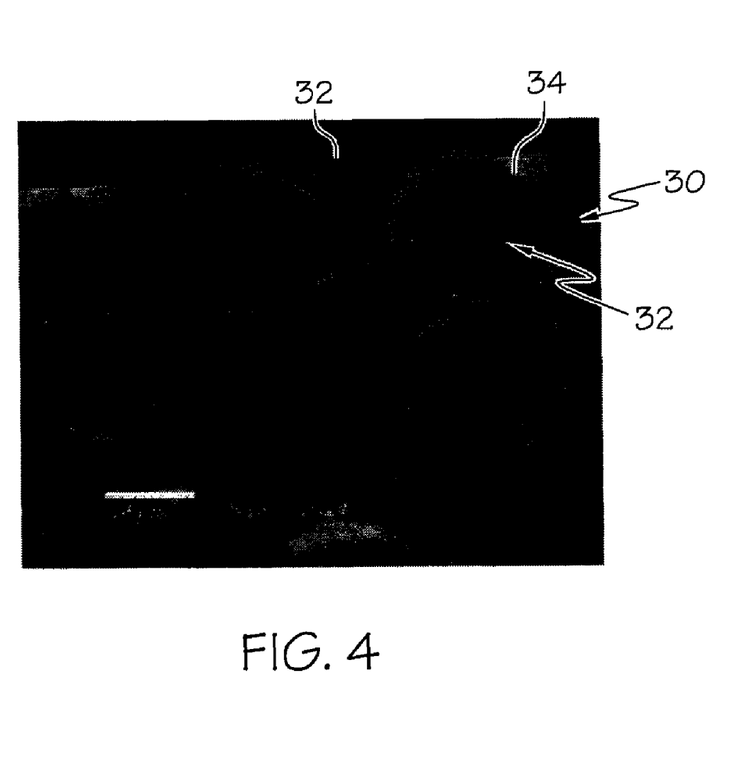
FIG. 4 is a photomicrograph end view of bicomponent fibers used in the filter media shown in FIG. 3.

Focusing upon specifics of the media substrate 12, attention is directed to FIG. 4. One aspect of the invention is that the substrate 12 is a nonwoven fabric substrate formed from a plurality of bicomponent synthetic fibers 30 using a spunbond process. Such an aspect for provision of bicomponent fibers may be via a core-sheath structure, an island structure, or a side-by-side structure. Referring also to FIG. 4, in the example embodiment, a bicomponent fiber 30 includes a core 32 and a sheath 34 circumferentially surrounding core 32. In one example, the bicomponent fibers 30 have a diameter of about 12 microns to about 18 microns.

Any suitable bicomponent synthetic fiber 30 can be used to make the nonwoven fabric of media substrate 12. Suitable materials for the core 32 and the sheath 34 of the bicomponent fiber 30 include, but are not limited to, polyester, polyamid, polyolefin, thermoplastic polyurethane, polyetherimide, polyphenyl ether, polyphenylene sulfide, polysulfone, aramid, and mixtures thereof. Suitable materials for the sheath of the bicomponent fiber include thermoplastic materials that have a lower melting point than the material of the core of the bi-component fiber, for example polyester, polyamid, polyolefin, thermoplastic polyurethane, polyetherimide, polyphenyl ether, polyphenylene sulfide, polysulfone, aramid, and mixtures thereof.

Figure 5:
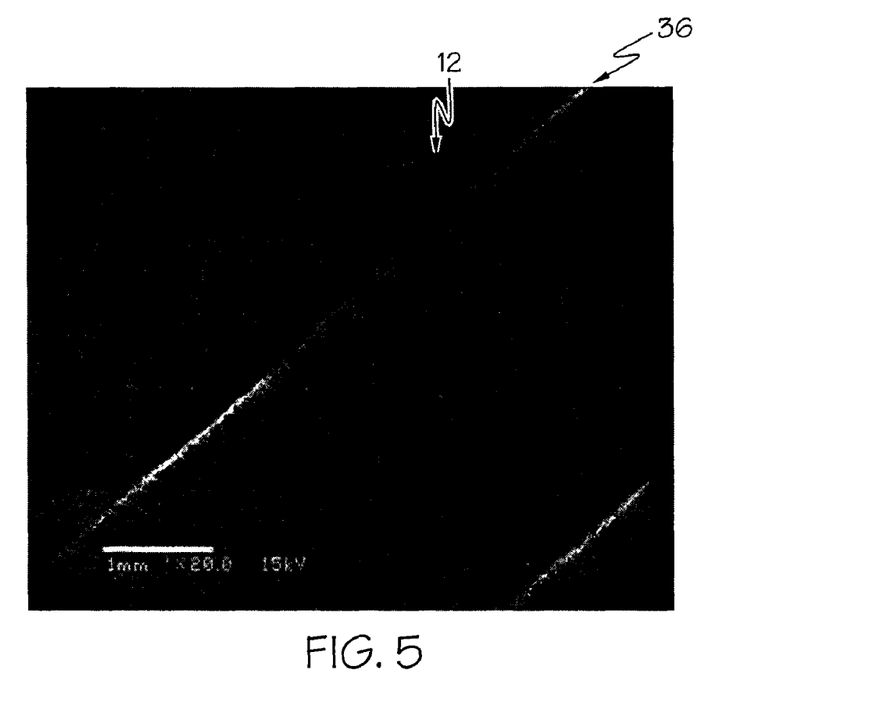
FIG. 5 is a photomicrograph top view of the spunbond bicomponent substrate shown in FIG. 3.

The bicomponent fibers 30 are meltspun through jets into a plurality of continuous fibers which are uniformly deposited into a random three dimensional web as shown in FIG. 5. The web can then be heated and embossed by a calendar roll which thermally bonds the web into a consolidated spunbond fabric 36. Heat from contact of the calender roll embossing pattern softens or melts the thermoplastic sheath 34 of bicomponent fibers 30 which binds the nonwoven fibers together only at the contact points of calender roll embossing pattern. The temperature is selected so that at least softening or fusing of the lower melting point sheath 34 portion of bicomponent fibers 30 occurs. In one embodiment, the temperature is about 90° C. to about 240° C. The desired connection of the fibers is caused by the melting and re-solidification of the sheath portion 34 after cooling.

One aspect of the present invention is a unique bond pattern of the base media substrate 12. The bond pattern can be defined by the embossing pattern of the calender rolls. The bond area provides for media durability and function while at the same time the bond points create areas of fused polymer that have zero air flow. The custom bond pattern may aid in improving the filtration efficiency of the composite filter media structure.

Figure 6:
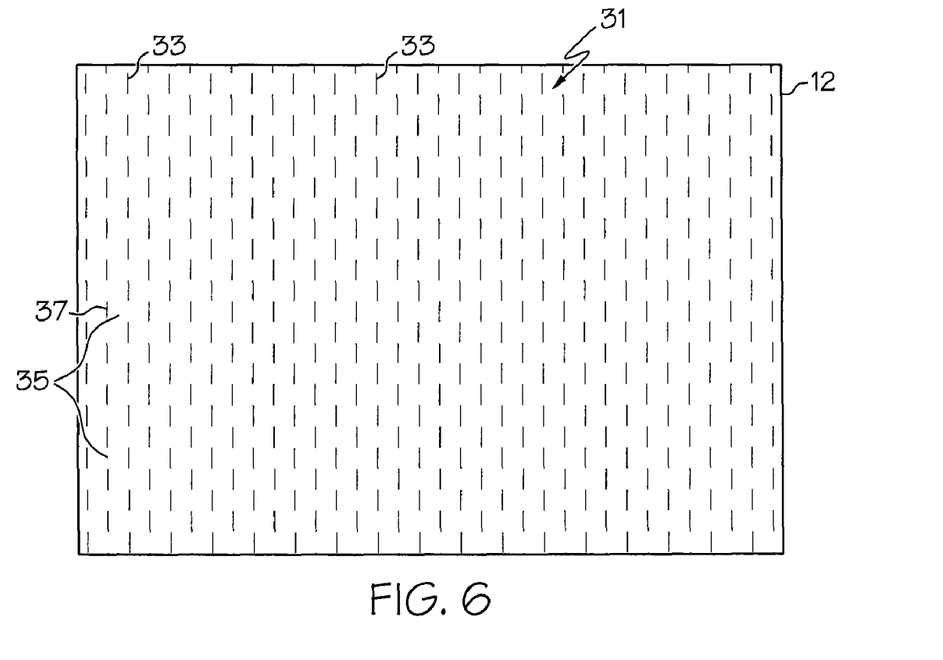
FIG. 6 is a schematic top illustration of a bond pattern of the spunbond bicomponent substrate shown in FIG. 3.

An example bond area pattern 31 for the base substrate 12 is shown in FIG. 6. The pattern has a plurality of substantially parallel discontinuous lines 33 of bond area to bond the bicomponent fibers 30 together to form the nonwoven fabric base substrate 12. The discontinuous lines 33 of the bond pattern 31 may be made in a direction parallel to a machine direction (longitudinal extent) of base media substrate 12. The parallel discontinuous lines 33 of the bond area are offset from each other so that there are locations 35 where there are no bond areas. The locations 35 without a bond area can be aligned with a bond area 37 of an adjacent discontinuous line 33. In one example, the bond area 37 of spunbond bicomponent fibers 30 in the media substrate 12 is about 10 percent to about 16 percent of the total area of the fabric. It is worth noting that some known spunbond fabrics may have a bond area of about 19 to 24 percent. A lower bond areas allows for the base media 12 to have an increase in air permeability or inversely low pressure drop at a given air flow. In one embodiment, the basis weight of the nonwoven synthetic fabric base media 12 is about 100 g/m$^2$ to about 330 g/m$^2$, and in another embodiment, about 150 g/m$^2$ to about 260 g/m$^2$.

Figure 8:
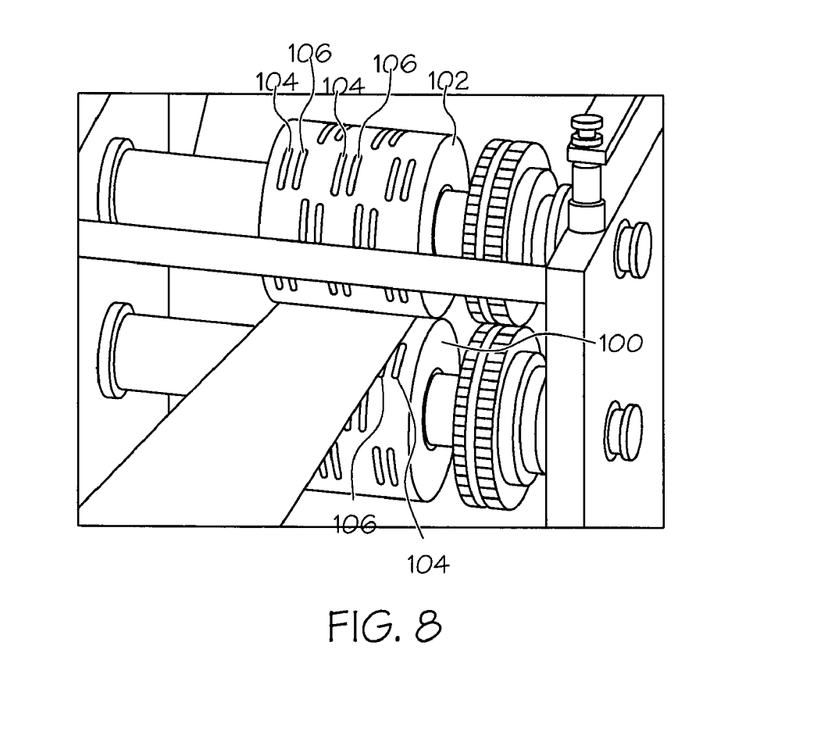
FIG. 8 is a schematic illustration of embossing rollers to emboss the composite filter media of FIG. 3, in accordance with an example aspect.
Figure 9:
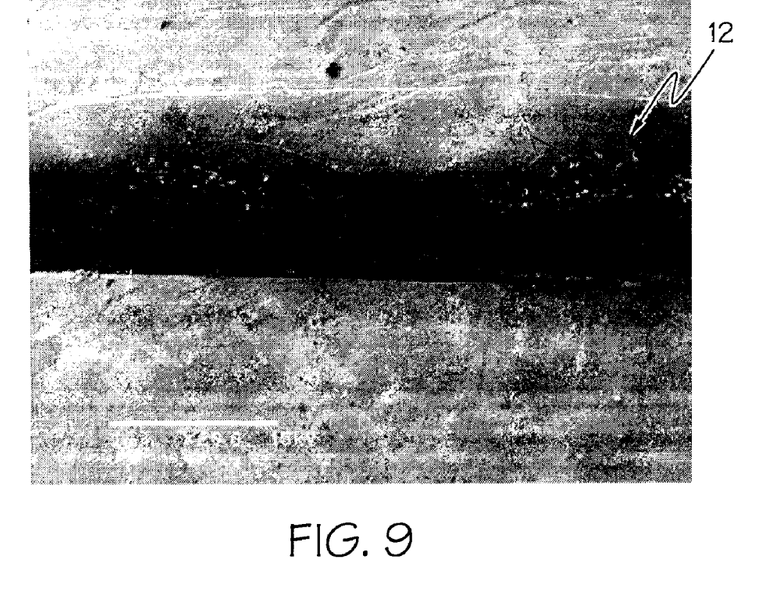
FIG. 9 is a photomicrograph of a cross-section of the bicomponent fibers used in the filter media shown in FIG. 3.

FIG. 8 is a schematic illustration of an example device with lower and upper embossing rollers 100, 102 for the embossing process. As will be appreciated there the rollers 100, 102 have a plurality of structures that mate with the base substrate 12 there between to apply localized heat and pressure. In the shown example, the rollers 100, 102 have a plurality rib 104 and channel 106 pairs that are located at an outer surface 108 of lower and upper embossing rollers 100 and 102. Each rib 104 and each channel 106 extend along a portion of the circumference of embossing roller 100 or 102. Also, each pair of a rib 104 and a channel 106 on the lower embossing roller 100 is aligned with a corresponding pair of a rib 104 and a channel 106 on the upper embossing roller 102 with the ribs and channels arranged so that each rib 104 on the lower roller 100 is aligned with and mates with a channel 106 on the upper roller 102, and each rib 104 on the upper roller 102 is aligned with and mates with a channel 106 on the lower roller 100. The plurality of pairs of ribs 104 and channels 106 are spaced apart across the embossing rollers 100 and 102 in staggered rows which define an example embossing pattern. FIG. 9 shows a cross section of the embossed base substrate 12 is shown. The embossed segment is located near the center of the cross section and has a reduced thickness dimension. In one example, the formed, embossed substrate 12 has a filtration efficiency of at least about 50%, measured in accordance with ASHRAE 52.2-1999 test procedure.

Turning to the nanofiber layer 20, this layer may be formed by an electro-blown spinning process that can include feeding a polymer solution into a spinning nozzle, applying a high voltage to the spinning nozzle, and discharging the polymer solution through the spinning nozzle while injecting compressed into the lower end of the spinning nozzle. The applied high voltage ranges from about 1 kV to about 300 kV. The electro-blown spinning process provides a durable three dimensional filtration layer of nanofibers that is thicker than known nanofiber filtration layers on known filter media. In the exemplary aspect the basis weight of nanofiber membrane layer 20 is about 2.0 g/m$^2$ to about 3.0 g/m$^2$, in another aspect, about 2.0 g/m$^2$ to about 2.5 g/m$^2$. It is appreciated that small ranges in weights for the nanofiber may be difficult to achieve such that a target of 2.5 g/m$^2$ may be used but the actual product may be 2.5 g/m$^2$+/−0.5 g/m$^2$.

Suitable polymers for forming nanofibers by the electro-blown spinning process are not restricted to thermoplastic polymers, and may include thermosetting polymers. Suitable polymers include, but are not limited to, polyimides, polyamides (nylon), polyaramides, polybenzimidazoles, polyetherimides, polyacrylonitriles, polyethylene terephthalate, polypropylene, polyanilines, polyethylene oxides, polyethylene naphthalates, polybutylene terephthalate, styrene butadiene rubber, polystyrene, polyvinyl chloride, polyvinyl alcohol, polyvinylidene chloride, polyvinyl butylene and copolymer or derivative compounds thereof. The polymer solution is prepared by selecting a solvent that dissolves the selected polymers. The polymer solution can be mixed with additives, for example, plasticizers, ultraviolet ray stabilizers, crosslink agents, curing agents, reaction initiators, and the like. Although dissolving the polymers may not require any specific temperature ranges, heating may be needed for assisting the dissolution reaction.

It can be advantageous to add plasticizers to the various polymers described above. Suitable plasticizers will depend upon the polymer, as well as upon the particular end use of the nanofiber layer. For example, nylon polymers can be plasticized with water or even residual solvent remaining from the electrospinning or electro-blown spinning process. Other plasticizers which can be useful include, but are not limited to, aliphatic glycols, aromatic sulphanomides, phthalate esters, including but not limited to, dibutyl phthalate, dihexl phthalate, dicyclohexyl phthalate, dioctyl phthalate, diisodecyl phthalate, diundecyl phthalate, didodecanyl phthalate, and diphenyl phthalate, and the like.

The nanofiber layer 20 may be applied, such as by the electro-blown spinning, directly on at least one side of the base substrate 12 to form the composite filter media 10. The resultant composite filter media has a minimum filtration efficiency of about 85%. The media substrate 12 has a high air permeability compared to known filter media which permits improved mechanical adhesion of the nanofibers to the media substrate 12. With such permeability, a vacuum may be applied from the second side 16 of the media substrate as a nanofiber layer 20 is applied to the first side 14 of the media substrate 12. Given that the new base media is more open to air flow through its higher air permeability, the effectiveness of the vacuum is greater, ensuring a strong mechanical bond of the nanofibers to the bicomponent fibers in the base media. In combination with the vacuum consolidation of the nanofibers, thermal consolidation from a drying process offers improved adhesion to the special bicomponent polyester fibers in the base media. In combination with the drying temperatures used in the application of nanofiber layer 20, a softening of the sheath portion 34 of the bicomponent fiber 30 can also occur and the nanofiber layer 20 can become denser and bonded to spunbond base media substrate 12.

At this point, a complete and useful composite filter media 10 is provided. However, as mentioned, further processing may be performed upon the composite filter media. As one example, the composite filter media 10 can be corrugated using opposing corrugating rollers at a temperature of about 90° C. to about 140° C. In an alternate embodiment, the composite filter media 10 can be embossed using opposing embossing rollers at a temperature of about 90° C. to about 140° C.

Figure 7:
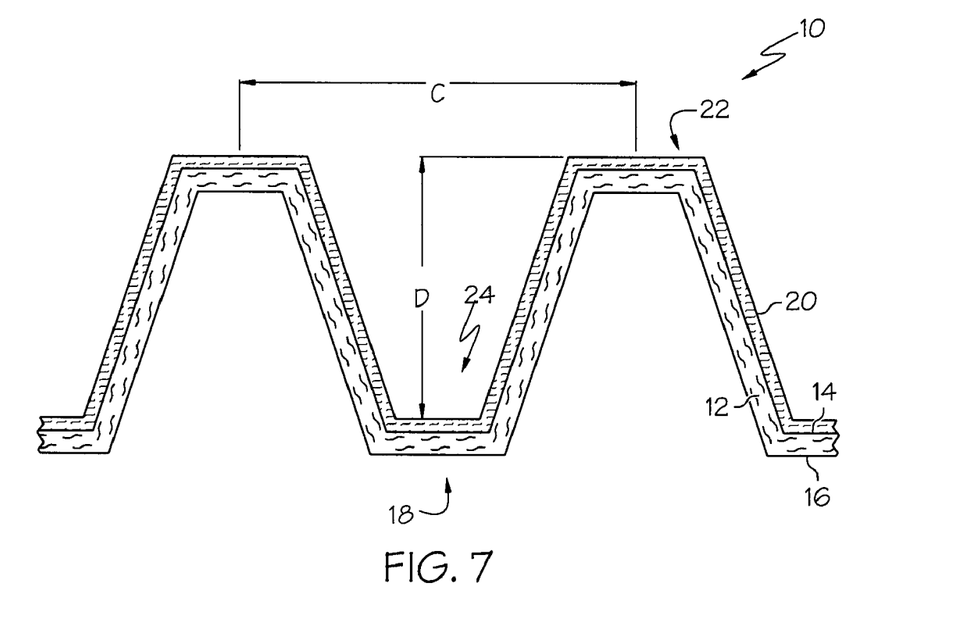
FIG. 7 is a cross sectional illustration of an example aspect of the composite filter media shown in FIG. 3 in a corrugated configuration.

Referring also to FIG. 7, an example of corrugations 18 that can be formed is shown. These example corrugations 18 are configured as an alternating up and down substantially V-shaped wave in composite filter media 10. Wave crests 22 and troughs 24 extend in the direction of travel of the web of substrate through the forming equipment. Troughs 24 can have an effective depth D of at least about 0.02 inch (0.5 mm) to permit breathability of filter media 10 at high dust loading to maintain low differential pressure, below about 4 inches water column (wc). A corrugation pitch C in the exemplary aspect is about 3 to about 10 corrugations per inch (about 1.2 to about 3.9 corrugations per cm), and in another aspect, from about 3 to about 6 corrugations per inch (about 1.2 to about 2.4 corrugations per cm). The combination of effective depth D and corrugation pitch C help provide improved touch points which help prevent pleat collapse under high static pressure from high air velocities and dust loadings. A uniform corrugation over the entire cross-section of the filter media 10 can also be provided.

Figure 10:
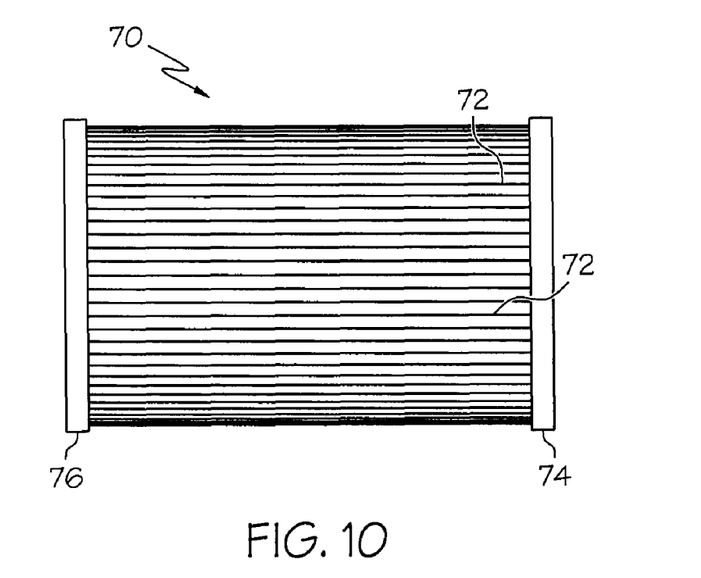
FIG. 10 is a side illustration of a filter cartridge that includes the filter media shown in FIG. 6.
Figure 11A:
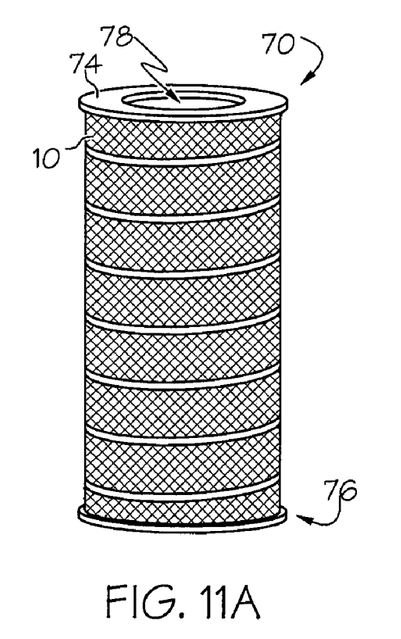
FIG. 11A is a perspective view of a first example filter element using the filter media of FIG. 3.
Figure 11B:
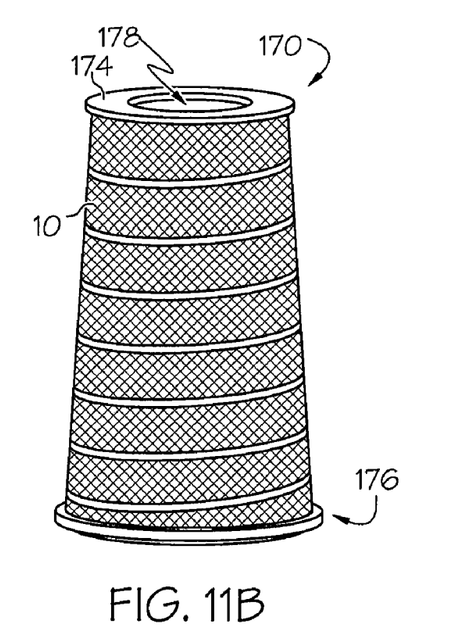
FIG. 11B is a perspective view of a second example filter element using the filter media of FIG. 3.

FIG. 10 is a side illustration of an example filter element 70 formed from the corrugations filter media 10. The filter element 70 includes a first end cap 74 and an opposing second end cap 76 with filter media 10 extending between end caps 74 and 76. The filter element 70 has a tubular shape with an interior conduit 78 (FIG. 11A). As a variation, the filter element 170 can also be conical in shape as shown in FIG. 11B. The filter element 170 has similar structural portions (e.g., a first end cap 174, a second end cap 176 and an interior conduit 178). It is appreciated that other shapes for the filter element 70, 170 can also be provided.

Figure 12:
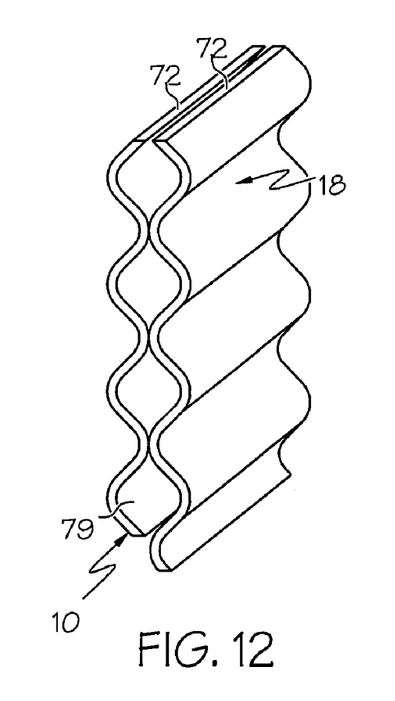
FIG. 12 is an enlarged perspective illustration of a portion of the filter cartridge shown in FIG. 10.

As yet another example, FIG. 12 shows an arrangement in which two portions of filter media 10 are adjacently positioned. Corrugations 18 in adjacent pleats 72 of filter element 70 define oval tubes 79 for air flow. The corrugations 18 extend substantially perpendicular to the edges of pleats 72.

Other components can also be provided as part of the filter element 70 along with the filter media 10. For example, internal and external perforated metal cages, urethane potting compounds, and urethane strapping compounds can all be provided.

Filter elements that include aspects in accordance with the present invention can be used in gas turbine inlet filtration systems. Of course, other systems may employ filter elements that include aspects in accordance with the present invention. In addition, a cleaning system can be connected to at least one filter element to direct air into the filter elements for cleaning purposes to remove dirt and dust.

Figure 13:
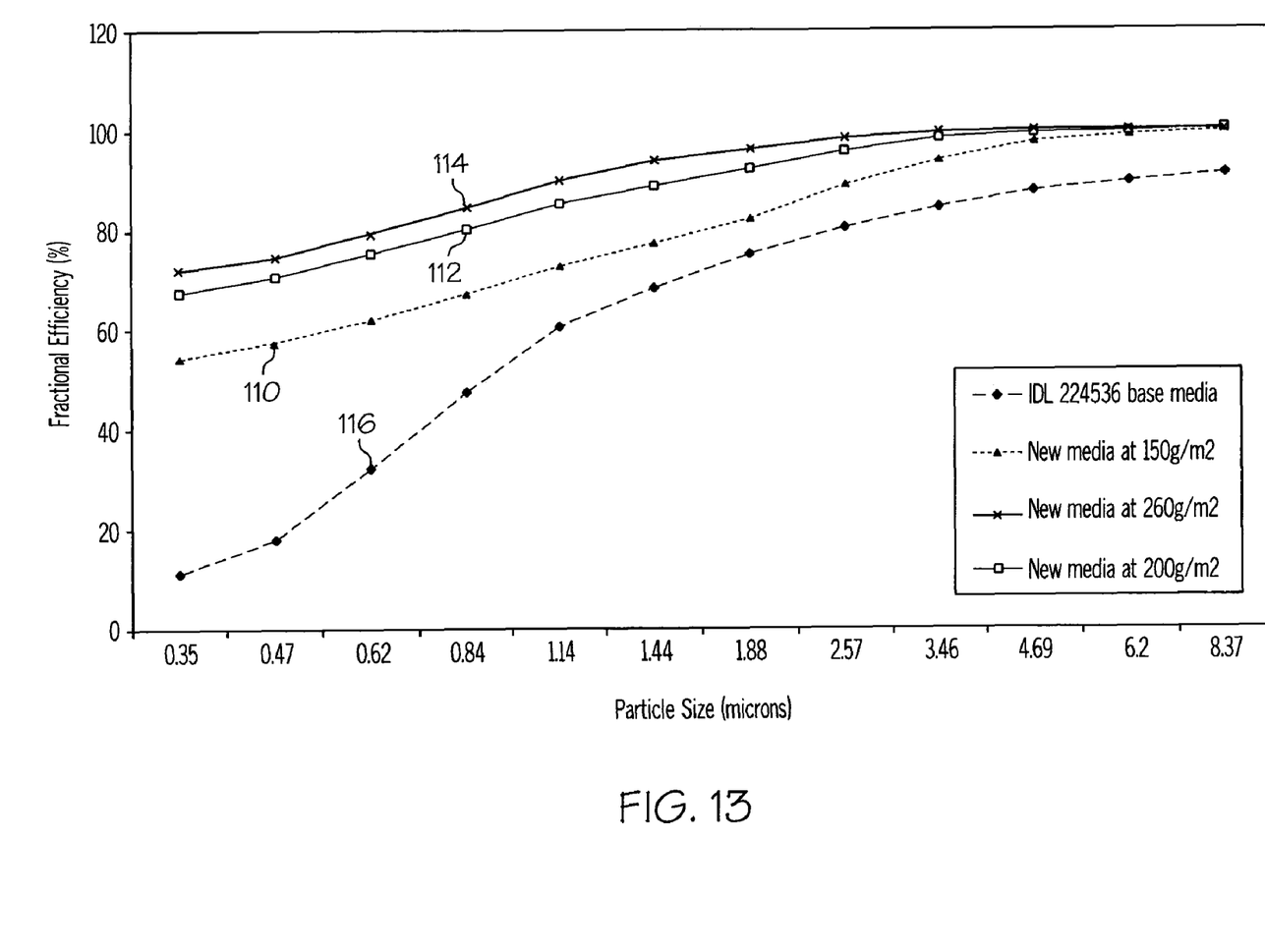
FIG. 13 is a graph of fractional efficiency versus particle size of base media substrates at various basis weights in accordance with the example aspect of FIG. 3.

Flat sheets of base media substrate 12 test samples having various basis weights were compared to a comparative base media substrate in a flat sheet fractional efficiency test in accordance with ASHRAE 52.2-1999 test method. Air containing KCl particles was directed through each test sample at a flow rate of about 10 ft/min. FIG. 13 shows a graphical representation of the comparison test. Line 110 represents base substrate 12 at a basis weight of 150 g/m², line 112 represents base substrate 12 at a basis weight of 200 g/m², and line 114 represents base substrate 12 at a basis weight of 260 g/m². Line 116 represents a comparative base media substrate. The base media substrates did not include a nanofiber layer. Base media substrate 12, in accordance with an example of the invention, at each basis weight has a higher efficiency than the comparative base substrate over the entire range of particle sizes of the KCl particles. Regardless of the basis weight of the media, as the particle size is increased the fractional efficiency is also increased. The data for FIG. 13 is based on Chart 1.

CHART 1

Fractional Efficiencies

| Particle size | Comparative base media (line 116) | New media at 150 g/m2 (line 110) | new media at 260 g/m2 (line 112) | new media at 200 g/m2 (line 114) |
|---|---|---|---|---|
| 0.35 | 11 | 54.2 | 72 | 67.5 |
| 0.47 | 18 | 57.5 | 74.5 | 70.8 |
| 0.62 | 32.2 | 62 | 79.6 | 75.6 |
| 0.84 | 47.5 | 67.4 | 84.7 | 80.5 |
| 1.14 | 60.6 | 72.8 | 89.8 | 85.4 |
| 1.44 | 68.3 | 77.3 | 93.8 | 89.1 |
| 1.88 | 75 | 82.1 | 96.2 | 92.4 |
| 2.57 | 80.6 | 88.7 | 98.1 | 96.2 |
| 3.46 | 84.3 | 94 | 99 | 98.6 |
| 4.69 | 87.7 | 97.4 | 99.9 | 99.4 |
| 6.2 | 89.6 | 98.7 | 99.9 | 99.8 |
| 8.37 | 91.1 | 99.4 | 99.9 | 99.9 |

Figure 14:
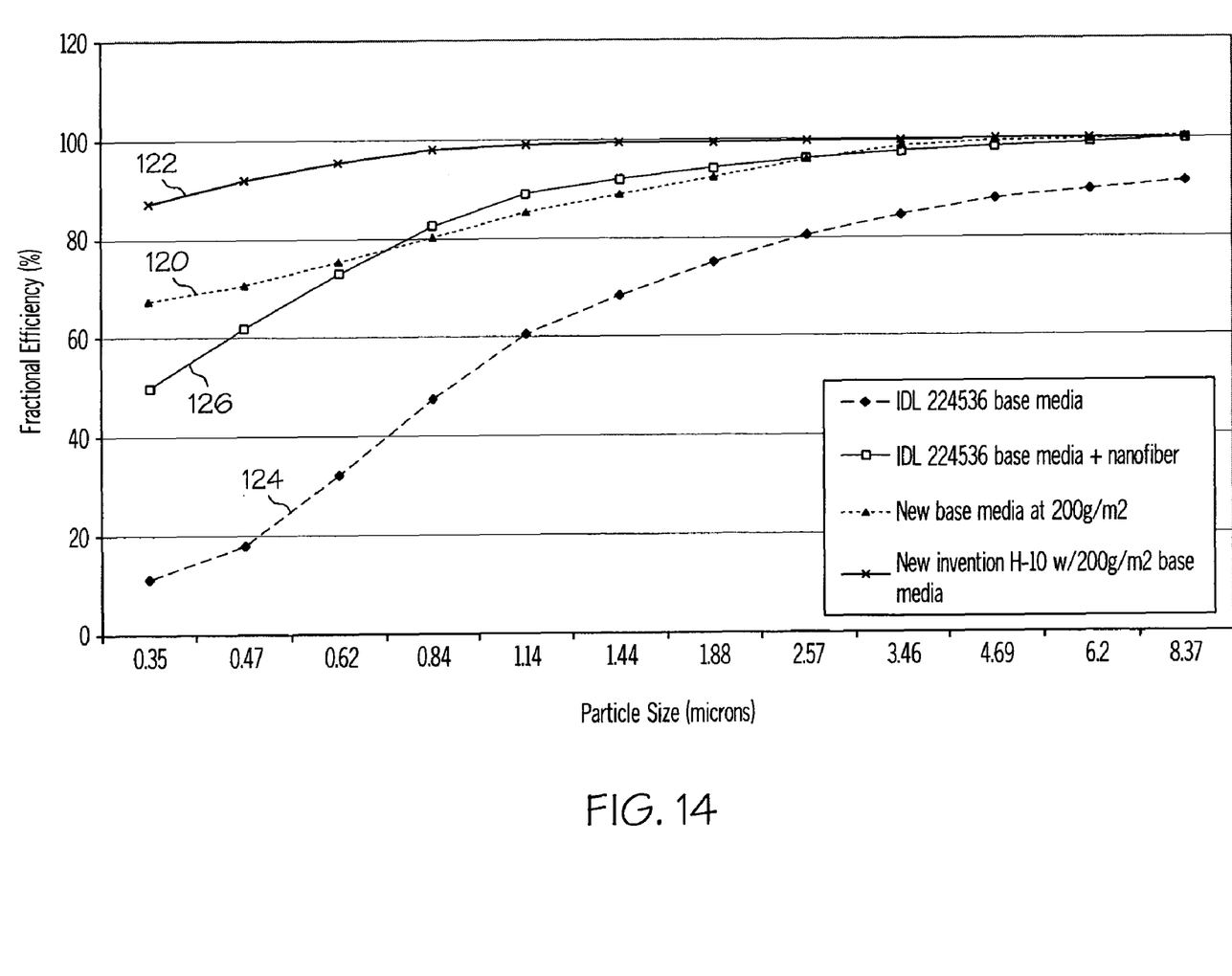
FIG. 14 is a graph of fractional efficiency versus particle size of base media substrates with and without a nanofiber layer in accordance with the example aspect of FIG. 3 compared to a comparative base media substrate with and without a nanofiber layer.

Flat sheets of base media substrate 12, and base media substrate 12 including nanofiber layer 20 were compared to a comparative base media substrate with and without a nanofiber layer in a flat sheet fractional efficiency test in accordance with ASHRAE 52.2-1999 test method. Air containing KCl particles was directed through each test sample at a flow rate of about 10 ft/min. FIG. 14 shows a graphical representation of the comparison test. Line 120 represents base media substrate 12 at 200 g/m², and line 122 represents base media substrate 12 at 200 g/m², including nanofiber layer 20. Line 124 represents a comparative base media substrate and line 126 represents the comparative base media substrate including a nanofiber layer. Base media substrate 12 with and without nanofiber layer 20 had a higher efficiency than the comparative base substrate with and without a nanofiber layer over the entire range of particle sizes of the KCl particles. The data for FIG. 14 is based on Chart 2.

CHART 2

Fractional Efficiencies

| Particle size | Comparative base media (line 124) | Comparative base media + nanofiber (line 126) | New base media at 200 g/m² (line 120) | New H-10, 200 g/m² base media (line 122) |
|---|---|---|---|---|
| 0.35 | 11 | 49.8 | 67.5 | 88.9 |
| 0.47 | 18 | 62 | 70.8 | 93.8 |
| 0.62 | 32.2 | 73 | 75.6 | 96.8 |
| 0.84 | 47.5 | 82.7 | 80.5 | 98.3 |
| 1.14 | 60.6 | 89 | 85.4 | 99.4 |
| 1.44 | 68.3 | 91.9 | 89.1 | 99.7 |
| 1.88 | 75 | 94.3 | 92.4 | 99.8 |

CHART 2-continued

Fractional Efficiencies

| Particle size | Comparative base media (line 124) | Comparative base media + nanofiber (line 126) | New base media at 200 g/m² (line 120) | New H-10, 200 g/m² base media (line 122) |
|---|---|---|---|---|
| 2.57 | 80.6 | 96.2 | 96.2 | 99.9 |
| 3.46 | 84.3 | 97.5 | 98.6 | 99.9 |
| 4.69 | 87.7 | 98.5 | 99.4 | 100 |
| 6.2 | 89.6 | 99.3 | 99.8 | 100 |
| 8.37 | 91.1 | 99.9 | 99.9 | 100 |

The unique construction of the filter media 10 is more durable than known filter media and provides for lower pressure drop build-up because of less deflection from the forces exerted on the filter media during the filtering and reverse cleaning operations in part due to the corrugation construction. The filter elements 70 can produce an average efficiency greater than about 85% capture of the most penetrating particle size of aerosol or dust (about 0.3 to about 0.5 micron) as compared to about 50-55% of known filter elements. Also, the nanofiber layer 20 has a higher basis weight than known filter media which permits filter media 10 to clean down more effectively under reverse pulse cleaning than known filter media. Further, the high basis weight of nanofiber layer 20 provides for a durable three dimensional surface filtration layer which has an extensive tortuous path that permits high efficiency and fine particle capture without restricting air flow or increasing pressure drop.

Chart 3 shows pressure drops for previous known products. A pressure of approximately between 12.5 mmH2O and 15.6 mmH2O with only a fractional efficiency between approximately 50.2% and 57.2% was observed. The examples of Chart 3 include various roll lengths, basis weights for the nanofiber, and various total basis weights which can result in different fractional efficiencies, and different pressure drops. For example, the comparative pressure drops and fractional efficiencies obtained in Chart 3 were obtained at various corrugations depths and Frazier porosities.

CHART 3

(Previous known products)

| HMT BW | Corrugation Effective Depth | Frazier Porosity @ 125 Pa | Fractional Efficiency % | Pressure Drop mm H2O |
|---|---|---|---|---|
| 2 gsm | 0.6 mm | 24 cfm | | |
| +/−0.5 gsm | >0.5 mm | >18 cfm | | |
| 2.0 | 0.50 | 18.2 | 57.23 | 15.59 |
| 2.0 | 0.57 | 22.5 | 51.96 | 13.22 |
| 2.0 | 0.52 | 21.2 | 55.58 | 12.78 |
| 2.0 | 0.58 | 21.6 | 52.74 | 15.16 |
| 2.0 | 0.49 | 18.7 | 53.6 | 13.88 |
| 2.0 | 0.52 | 21.4 | 52.38 | 13.04 |
| 2.0 | 0.56 | 22 | 50.15 | 15.65 |
| 2.0 | 0.59 | 24.2 | 52.63 | 13.42 |
| 2.0 | 0.52 | 20.3 | 53.36 | 12.98 |
| 2.0 | 0.59 | 23.1 | 54.61 | 13.87 |
| 2.0 | 0.59 | 23.5 | 51.5 | 12.49 |
| 2.0 | 0.52 | 21.5 | 53.21 | 12.63 |
| 2.0 | 0.60 | 24.2 | 51.97 | 12.69 |
| 2.0 | 0.52 | 19 | 51.87 | 14.81 |
| 2.0 | .422-.437 | 20 | 53.4 | 11.38 |

As shown in the following chart, Chart 4, a plurality of information is provided that was obtained during a comparison of actual products. In one example in accordance with the new invention, an approximate 2.5 g/m² basis weight for the nanofiber layer was determined to provide good efficiency for the filter element 70. The various examples have varying basis weights and roll lengths yet still consistently achieve approximately an 85% filtration efficiency. The data shows that approximately a 2.5 g/m² weight provides good filtration efficiency, good surface filtration, and good long term integral durability. When the nanofiber layer had a larger basis weight than 3.0 g/m², it was determined that the filter element 70 decreased in performance.

CHART 4

| Finished Roll# | | HMT Basis Weight gsm | Total Basis Weight gsm | Fiber Size nm | Frazier Porosity (AP) meters l/m2/s Test conditions 125 Pa R (Release) R | Fractional Efficiency % 0.3 µm @ 321 pm R | Pressure Drop mmH2O 0.3 µm @ 321 pm R |
|---|---|---|---|---|---|---|---|
| Test-A | Hand Samp | 2 | 217.2 | | 160 | 83.5 | 4.4 |
| Test-B | Hand Samp | 2.3 | 200.8 | 267 | 135 | 87.2 | 4.9 |
| Test-C (choice) | Hand Samp | 2.7 | 209.2 | | 142 | 86.2 | 5.2 |
| Test-D | Hand Samp | 2.5 | 210.4 | | 146 | 85.4 | 5.5 |
| HS10003101 | 394 | 2.5 | 200.6 | | 133 | 88.2 | 5.1 |
| HS10003111 | 406 | 2.5 | 202.8 | | 132 | 87.2 | 5.8 |
| HS10003121 | 390 | 2.5 | 203.5 | 348 | 131 | 85.2 | 5.9 |
| Test-E (choice) | Hand Samp | 2.5 | 208.1 | | 145 | 86.6 | 5.1 |
| HS10003131 | 384 | 2.5 | 207.6 | | 142 | 85.4 | 5.1 |
| HS10003141 | 390 | 2.5 | 194.3 | | 150 | 85.4 | 5.5 |

CHART 4-continued

| | | | | Roll Length | | |
|---|---|---|---|---|---|---|
| | HMT Basis Weight | Total Basis Weight | Fiber Size | Frazier Porosity (AP) meters | Fractional Efficiency | Pressure Drop |
| | gsm | gsm | nm | l/m2/s | % | mmH2O |
| | | | | Test conditions | | |
| Finished | | | | 125 Pa R (Release) | 0.3 μm @ 321 pm | 0.3 μm @ 321 pm |
| Roll# | | R | R | R | R | R |
| HS10003151 385 | 2.5 | 206.4 | | 132 | 85.7 | 5.3 |
| HS10003161 386 | 2.5 | 205.7 | 329 | 128 | 85.0 | 5.5 |
| HS10003171 406 | 2.5 | 201.8 | | 138 | 88.3 | 5.2 |
| HS10003181 390 | 2.5 | 210.7 | | 133 | 84.9 | 5.5 |

It is also shown by Chart 4 that a pressure drop for the filter media is substantially lower than the example shown for previous prior art products, as shown in the following Chart 3. For example, tests showed that in one example, the pressure drop can be between approximately 4.4 mmH2O and approximately 6.0 mmH2O for the subject invention, as shown in Chart 4. It is appreciated that a comparative prior art device that does not include the same filter media and nanofiber layer would only have a pressure of approximately between 12.5 mmH2O and 15.6 mmH2O with only a fractional efficiency between approximately 50.2% and 57.2%, as shown in Chart 3. The examples of Chart 3 and Chart 4 include various roll lengths, basis weights for the nanofiber, and various total basis weights which can result in different fractional efficiencies, and different pressure drops. The new invented media will offer improved filtration efficiency and turbine blade protection at similar or equivalent cost to current technologies while not incurring any major increases in pressure drop. The improved filtration efficiency can be attained at similar or equivalent pressure drops so there would be very little changes needed in the operation of the turbine. Chart 4 represents a 35% increase in filtration efficiency at 0.30 microns and a 50% lower drop pressure.

Figure 15:
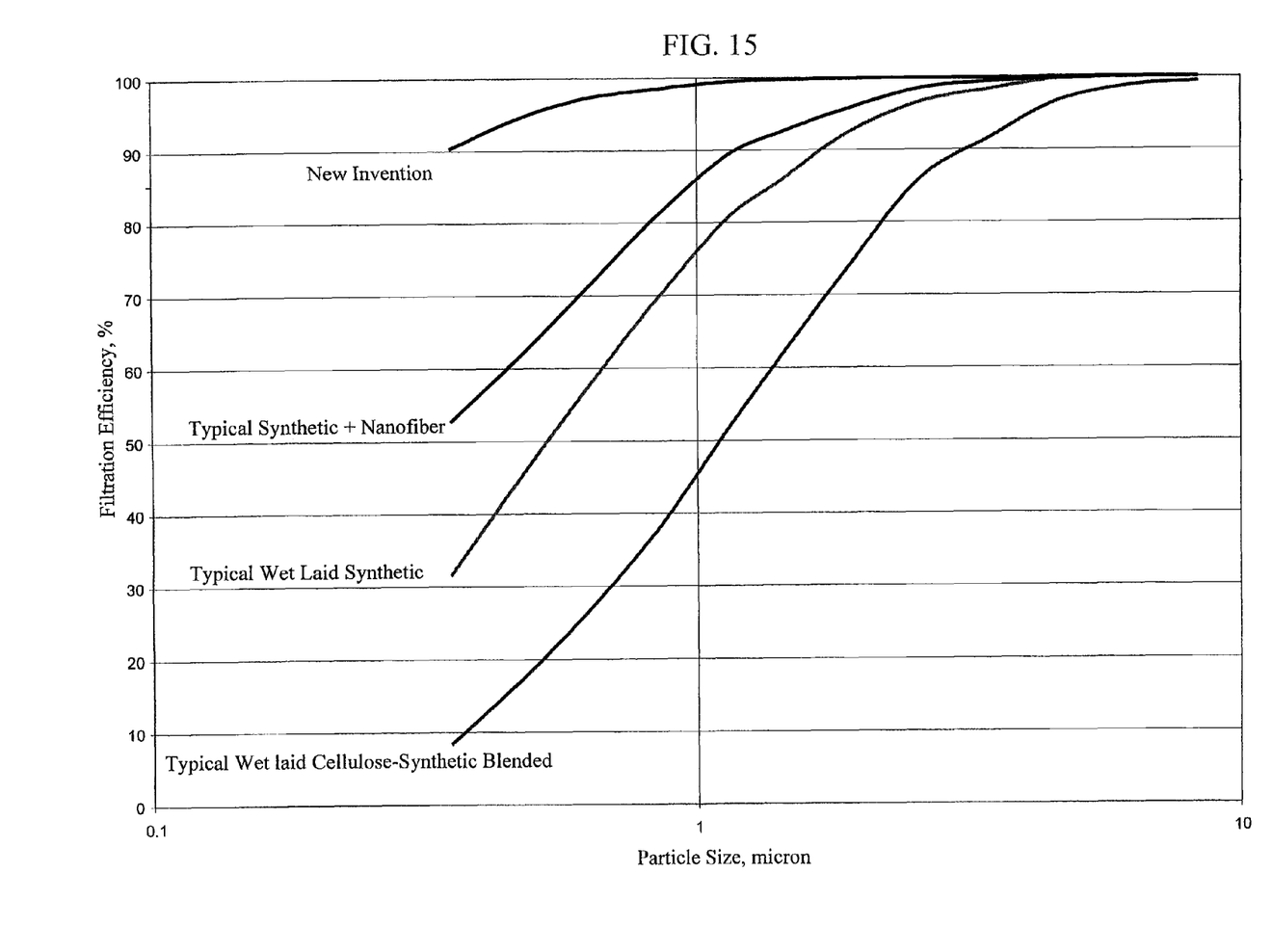
FIG. 15 is a graph of ASHRAE 52.2 fractional efficiency versus particle size comparing the new invention with standard media.

FIG. 15 is a graph of ASHRAE 52.2 fractional efficiency versus particle size comparing the new invention with standard media.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:

1. A composite filter media structure including:
   a base substrate including a nonwoven fabric substrate formed from a plurality of bicomponent synthetic fibers using a spunbond process;
   a nanofiber layer deposited on one side of the base substrate by an electro-blown spinning process; and
   the base substrate and the nanofiber layer configured to provide at least an 85% filtration efficiency measured in accordance with an ASHRAE 52.2-1999 test method;
   wherein the nonwoven fabric substrate has a basis weight of about 150 g/m² to about 260 g/m²; and
   the composite filter media structure provides the at least 85% fractional efficiency at pressure drops between approximately 4.4 mmH2O and approximately 6.0 mmH2O.

2. A composite filter media structure according to claim 1, wherein the nanofiber layer has a basis weight of about 2.0 g/m² to about 3.0 g/m².

3. A composite filter media structure according to claim 1, wherein a thickness of the nanofiber layer is approximately 10 microns.

4. A composite filter media structure according to claim 1, wherein the composite filter media structure captures penetrating particle sizes of about 0.3 to about 0.5 microns.

5. A composite filter media structure according to claim 1, wherein the composite filter media structure further including a plurality of corrugations.

6. A method of making a composite filter media, the method including:
   forming a nonwoven fabric substrate formed from a plurality of bicomponent synthetic fibers using a spunbond process; and
   applying a nanofiber layer by electro-blown spinning a polymer solution to form a plurality of nanofibers on at least one side of the nonwoven fabric to form the composite filter media such that the composite filter media has a filtration efficiency of at least about 85%;
   wherein the step of forming the nonwoven fabric substrate includes forming the nonwoven fabric substrate to have a basis weight of about 150 g/m² to about 260 g/m²; and
   the composite filter media structure provides the at least 85% fractional efficiency at pressure drops between approximately 4.4 mmH2O and approximately 6.0 mmH2O.

7. A method in accordance with claim 6 wherein the step of applying the nanofiber layer includes applying the nanofiber layer to have a basis weight of about 2.0 g/m² to about 3.0 g/m².

8. A method in accordance with claim 6 wherein the step of applying the nanofiber layer includes applying the nanofiber layer to have a thickness of approximately 10 microns.

9. A method in accordance with claim 6 wherein the composite filter media structure captures the most penetrating particle sizes of about 0.3 to about 0.5 microns.

10. A method in accordance with claim 6, further including the step of corrugating the composite filter media structure.

* * * * *